Nov. 17, 1925.                                                                    1,561,661
E. D. PEPPER
FLYTRAP
Filed June 22, 1923
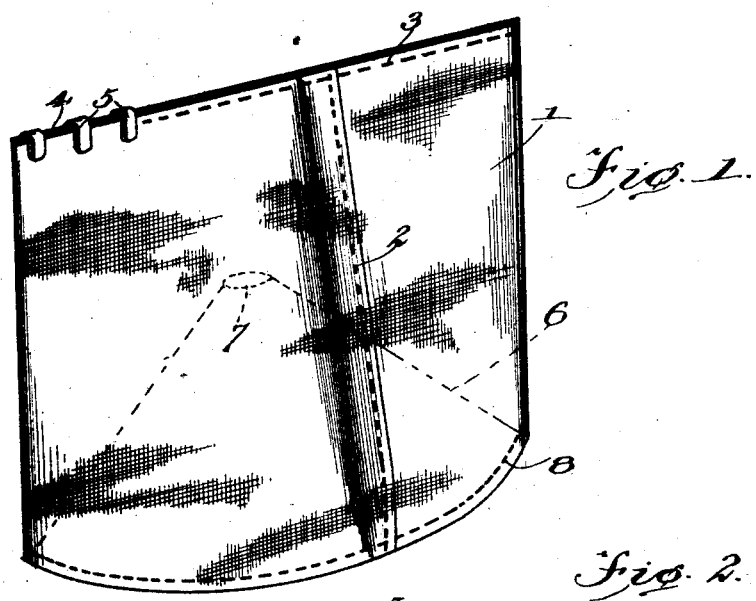
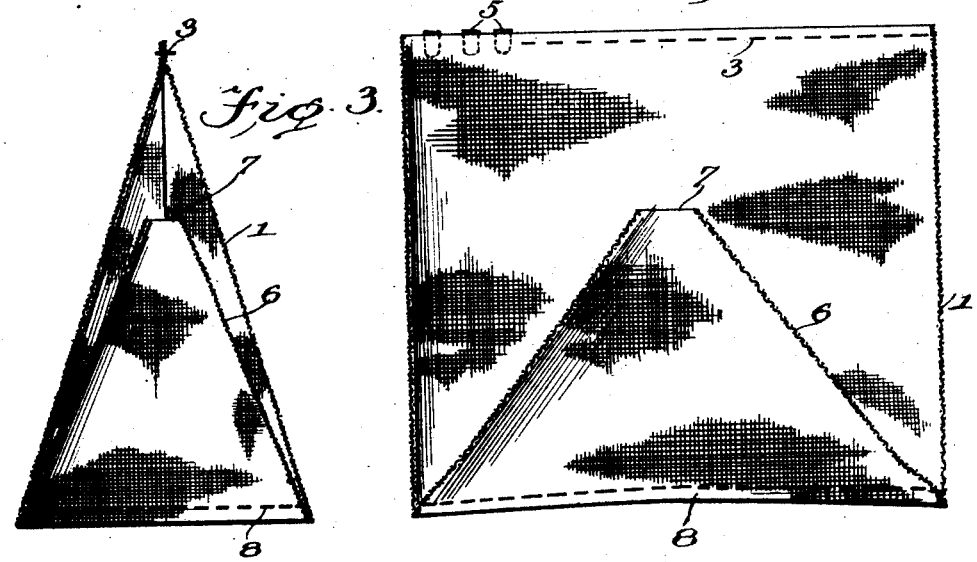
WITNESSES
INVENTOR
E. D. Pepper,
BY
ATTORNEYS Patented Nov. 17, 1925.

1,561,661

UNITED STATES PATENT OFFICE.

ELISHA DAVID PEPPER, OF PICKENS, MISSISSIPPI.

FLYTRAP.

Application filed June 22, 1923. Serial No. 647,107.

*To all whom it may concern:*

Be it known that I, ELISHA D. PEPPER, a citizen of the United States, and a resident of Pickens, in the county of Holmes and State of Mississippi, have invented certain new and useful Improvements in Flytraps, of which the following is a specification.

My invention relates to improvements in fly traps and it consists in the combinations and arrangements hereinafter described.

An object of my invention is to provide a fly trap which is of extremely simple construction, which can be manufactured cheaply and which is thoroughly effective for the purpose intended and practical commercially.

A further object of the invention is to provide a fly trap of the character described which can be folded flat for the purpose of packing, storage or transportation.

Other objects and advantages will be apparent from the following description, and the novel features of the invention will be particularly outlined in the appended claim.

My invention is illustrated in the accompanying drawings, forming a part of this application, in which, Figure 1 is a perspective view of my invention in fly traps.

Figure 2 is a longitudinal vertical section through the trap.

Figure 3 is a transverse vertical section through the trap.

In carrying out my invention, I provide an outer casing 1 which is substantially of cap shape and is formed of a foraminated pliable material that is preferably, although not necessarily metallic, such as wire screen of small mesh. In forming the outer casing 1, I may make use of a substantially rectangular piece of screening and may fashion this piece of material so that the vertical edges thereof overlap when the piece of material is placed on its one side edge. The lapped edge portions are permanently secured together, as by means of a row of stitching 2 and the confronting or opposite sides of the outer casing are then bent to converge together at their upper edges and the contiguous upper edge portions thereof are permanently secured together for the greater part of their length by a row of stitching 3 or like fastening means, thereby defining an outlet 4 at the upper end of the outer casing, which outlet is normally closed through the agency of clips 5 holding the side walls of the outlet clamped together. The bending of the sides of the outer casing together at their upper edges will cause the lower edges of such sides to be raised, as at 9 in Figure 2, out of contact with a flat supporting surface on which the lower edges of the ends of the outer casing rest and thus will permit ingress of insects.

An inner casing 6 which is of truncated form and is made of a foraminated material such as wire screen, is disposed within the outer casing. The inner casing 6 is formed to provide a relatively small opening 7 at its upper end and is open at its lower end, the area of the lower end thereof being substantially the same as that of the lower end of the outer casing 1. With this organization the walls of the inner casing converge from the lower end to the upper end thereof and the inner casing closely interfits at its lower end the lower end portion of the outer casing, being secured to the latter by a row of stitching 8 or like fastening means. The inner casing terminates at an appreciable distance from the upper end of the outer casing, thus defining with the outer casing a chamber or compartment which is normally in communication with the exterior of the outer casing C through the restricted opening 7.

From the foregoing description of the various parts of the device, the operation thereof may be readily understood. The trap formed in the manner described is positioned so that flies and other insects may pass freely into the inner casing thence through the upper lower end thereof and may pass through the relatively small opening 7 into the outer casing 1. In view of the position of the open upper end of the inner casing within the outer casing, the flies and insects entering the latter will not return through the opening 7 to the interior of the inner casing but will remain imprisoned. The imprisoned flies and insects may be killed in any suitable known manner, as by submerging the trap in water, and the walls of the outlet 4 may be spread apart so that the dead flies and insects may be removed from the trap. Any suitable bait may be placed within the trap to attract the flies and insects if desired.

The device is simple in construction and can be manufactured at a relatively low cost. When it is desired to transport the trap or a great many traps, these traps may be folded flat and thus packed into small compass.

Obviously my invention is susceptible of embodiment in forms other than that illustrated in the accompanying drawings, and I therefore consider as my own all such modifications and adaptations thereof as fairly fall within the scope of the appended claim.

What I claim is:

A fly trap comprising an outer casing formed of a substantially rectangular sheet of foraminous material disposed edgewise and bent until one vertical edge portion thereof overlaps the other vertical edge portion, said lapped edge portions being secured together, the side portions of the outer casing being bent to converge together at their upper edges, thereby drawing the lower edges of the sides of the outer casing upwardly above the level of the lower edges of the ends of the casing and providing inlet spaces between said lower edges of the sides of the outer casing and a flat supporting surface on which the outer casing rests, means permanently securing the converging upper edge portions of said outer casing together for part of the length of the outer casing and releasably securing the convergent upper edge portions together for the remainder of the length of the outer casing, and an inner casing made separately from the outer casing, said inner casing having substantially the shape of a truncated cone and being adapted at its lower end to closely fit in the lower end portion of the outer casing when the body of the inner casing has been inserted in the outer casing at the lower end of the latter, said inner casing having a relatively small opening at its upper end, and means securing the lapped lower end portions of said inner and outer casings in contiguous relation to each other at all points around the lower end of said inner casing.

ELISHA DAVID PEPPER.